(12) United States Patent
Shao et al.

(10) Patent No.: US 11,834,862 B1
(45) Date of Patent: Dec. 5, 2023

(54) MODULAR ENERGY-DISSIPATING FABRICATED STRUCTURE FOR TRANSMISSION TOWER

(71) Applicant: POWERCHINA SEPCO1 ELECTRIC POWER CONSTRUCTION CO., LTD., Ji'nan (CN)

(72) Inventors: Guodong Shao, Ji'nan (CN); Chongyang Zhang, Ji'nan (CN); Li Tian, Ji'nan (CN); Jiyong Pang, Ji'nan (CN); Tao Li, Ji'nan (CN)

(73) Assignee: POWERCHINA SEPCO1 ELECTRIC POWER CONSTRUCTION CO., LTD., Ji'nan (CN)

( * ) Notice: Subject to any disclaimer, the term of this patent is extended or adjusted under 35 U.S.C. 154(b) by 0 days.

(21) Appl. No.: 18/224,081

(22) Filed: Jul. 20, 2023

(30) Foreign Application Priority Data

Dec. 19, 2022 (CN) .......................... 202211629644.8

(51) Int. Cl.
*E04B 1/98* (2006.01)
*E04H 9/02* (2006.01)

(52) U.S. Cl.
CPC ............. *E04H 9/0235* (2020.05); *E04B 1/98* (2013.01)

(58) Field of Classification Search
CPC ......... E04B 1/98; E04H 9/0215; E04H 9/021; E04H 12/00; E04H 12/34; E04H 9/02; E04H 9/0235
See application file for complete search history.

(56) References Cited

U.S. PATENT DOCUMENTS

| | | | |
|---|---|---|---|
| 9,255,399 B2* | 2/2016 | Ruan | E04H 12/22 |
| 11,011,893 B2* | 5/2021 | Kechroud | E04B 1/98 |
| 11,384,558 B2* | 7/2022 | Dicleli | E04H 9/023 |
| 2005/0109912 A1* | 5/2005 | Mulder | H01Q 1/005 248/564 |
| 2017/0108034 A1* | 4/2017 | McGuire | F16C 11/0604 |

FOREIGN PATENT DOCUMENTS

CN        113883213 A        1/2022

* cited by examiner

*Primary Examiner* — Brian E Glessner
*Assistant Examiner* — Daniel J Kenny
(74) *Attorney, Agent, or Firm* — Bayramoglu Law Offices LLC

(57) ABSTRACT

A modular energy-dissipating fabricated structure for a transmission tower includes a base, two T-shaped beams, a vibration damping mechanism, a connection plate, and four supporting beams. The vibration damping mechanism slides to generate the damping force and energy dissipation. The larger the displacement of the vibration damping mechanism, the greater the damping force provided by the system. This effectively reduces vibration of an upper structure of the transmission tower, and lowers a probability of damaging the upper structure in a natural disaster. The modular energy-dissipating fabricated structure realizes hierarchical control under different loads. Under an action of a dynamic load such as a strong wind, a small sliding range of the vibration damping mechanism can realize vibration damping and energy dissipation purposes of the structure. When a strong dynamic load such as an earthquake is applied to the structure, the vibration damping mechanism reduces an impact on the structure.

8 Claims, 4 Drawing Sheets

MODULAR ENERGY-DISSIPATING FABRICATED STRUCTURE FOR TRANSMISSION TOWER

CROSS REFERENCE TO THE RELATED APPLICATIONS

This application is based upon and claims priority to Chinese Patent Application No. 202211629644.8, filed on Dec. 19, 2022, the entire contents of which are incorporated herein by reference.

TECHNICAL FIELD

The present disclosure relates to the field of transmission tower construction, and in particular to a modular energy-dissipating fabricated structure for a transmission tower.

BACKGROUND

The construction scale for transmission towers in China is huge. As an important structural part in the transmission line, a transmission tower foundation takes a large proportion in the whole line project in construction cost, construction period and labor consumption. The construction period of the transmission tower foundation accounts for about 50% of a total construction period of the line. At present, the transmission tower foundation still focuses on a cast-in-situ concrete foundation, and involves processes such as excavation of a foundation pit, template supporting, steel bar binding, concrete pouring, and maintenance. This causes large labor consumption and has big differences in construction quality. Meanwhile, in view of the frequent natural disasters, active seismic fault belts, and the unique geographical location at an intersection between the Eurasian continent and the Pacific Ocean, China is considered as a world-famous monsoon region and a world-famous typhoon-prone region. Hence, the transmission line must be able to withstand various disasters such as earthquakes, monsoons and typhoons. To cater for economic development, trans-regional and trans-provincial energy allocation may use the resource advantages of different regions. As an efficient energy transmission method, the transmission lines are constructed on a large scale, which has become an industry consensus. In the infrastructure construction, improving construction efficiency of the transmission line and making the transmission line safe and stable for earthquakes and other natural disasters is challenging.

Conventional fabricated foundations mainly include the precast cup-shaped foundation, the independent fabricated foundation, the fabricated slab foundation and the fabricated strip foundation. They are neither connected reliably, nor subjected to a vibration damping measure. These existing fabricated foundations cannot satisfy the transmission line safety requirements for lack of novelty in structure and lack of vibration damping measures.

SUMMARY

In view of above shortages, the present disclosure provides a modular energy-dissipating fabricated structure for a transmission tower, to reduce a vibration response of a transmission tower line system in each direction under a wind load, an earthquake and other disasters, and make a transmission line safer. With a novel transmission tower foundation, the present disclosure is economic and efficient in foundation construction, and safe and reliable in structural performance.

The present disclosure provides the following technical solutions to solve the technical problems:

A modular energy-dissipating fabricated structure for a transmission tower includes:

a base including an upper end provided with a plurality of connecting holes, where after anchor bolts pass through the connecting holes, the base is fixed in a foundation through nuts;

two T-shaped beams provided crisscross on an upper end surface of the base, where vibration damping mechanisms are respectively and slidably provided at two sides of each of the T-shaped beams, and an upper end of each of the vibration damping mechanisms is provided with a ball head II;

a connection plate fixed at a lower end of a tower leg of the transmission tower, where ball heads I are respectively provided at four lower corners of the connection plate; and four supporting beams, where ball grooves are respectively formed in an upper end and a lower end of each of the supporting beams, the ball head I is rotatably provided in the ball groove in the upper end of the supporting beam, and the ball head II is provided in the ball groove in the lower end of the supporting beam, where when the transmission tower moves longitudinally, the transmission tower drives the vibration damping mechanisms via the connection plate through the four supporting beams to slide outward or inward along the T-shaped beams, and the vibration damping mechanisms generate operation resistances relative to the T-shaped beams.

In order to improve an entire rigidity of the base, a cavity is provided in the base; grouting holes communicating with the cavity are formed in a periphery of the base; and concrete is poured into the cavity in the base through the grouting holes.

For the sake of a limiting action, the modular energy-dissipating fabricated structure for a transmission tower further includes limiters provided at an upper end of the T-shaped beam and respectively located at an inner side and an outer side of the vibration damping mechanism.

Further, the vibration damping mechanism includes:

a box body provided with a sealed cavity inside, where a T-shaped groove matched with the T-shaped beam is formed in a lower end of the box body, and the box body is slidably provided on the T-shaped beam through the T-shaped groove; and a long hole is horizontally formed in an upper end of the T-shaped groove along a length direction of the T-shaped beam; and a rotating shaft is provided along a vertical direction, with a lower end passing through the long hole and rotatably provided on the T-shaped beam through a bearing;

a transmission disc horizontally provided on the rotating shaft, where a transmission belt is horizontally provided in the box body along the length direction of the T-shaped beam; and after the transmission belt wraps around the transmission disc, two ends of the transmission belt are respectively fixed on an inner wall of an inner end and an inner wall of an outer end of the box body;

N tracks horizontally provided on a top inner wall of the box body along the length direction of the T-shaped beam, where a steel ball is embedded into each of the tracks in a rolling manner; and an energy-dissipating disc horizontally provided on the rotating shaft, where a plurality of springs are fixed at a lower end of the energy-dissipating disc along the vertical direction, a lower end of each of the springs is connected to the box body, and under an elastic force of the spring, an upper end surface of the energy-dissipating disc comes in contact with a lower end of the steel ball.

The modular energy-dissipating fabricated structure for a transmission tower further includes rubber pads respectively provided at a front side and a rear side of the box body.

The N is 10.

In order to further improve a damping effect, the modular energy-dissipating fabricated structure for a transmission tower further includes sealed damping liquid cavities respectively formed in a left end and a right end of the box body; a damping liquid is provided in each of the damping liquid cavities; cylinders are respectively provided at the left end and the right end of the box body along a horizontal direction; each of the cylinders is sealed peripherally, with an open inner end; an axis of the cylinder is horizontally provided along a left-right direction; a piston is slidably provided in the cylinder along the horizontal direction; an outer end of the cylinder is airtightly connected to a connecting tube; a lower end of the connecting tube is soaked in the damping liquid; a rotating collar is rotatably provided on the rotating shaft; connecting shafts are respectively hinged at a left end and a right end of the rotating collar; an outer end of the connecting shaft is hinged with a connecting rod through a pin roll; and an outer end of the connecting rod is connected to an inner end surface of the corresponding piston at a same side.

In order to further improve the damping effect, the modular energy-dissipating fabricated structure for a transmission tower further includes gate-shaped grooves respectively formed in the left end and the right end of the box body; a plurality of energy-dissipating balls are filled in each of the grooves; a bottom of an outer end of the groove communicates with the damping liquid cavity; a position where the groove communicates with the damping liquid cavity is provided with a mesh plate II; a plurality of meshes are formed in the mesh plate II; an aperture of each of the meshes is less than an outer diameter of the energy-dissipating ball; a bottom of an inner end of the groove communicates with the cylinder; a position where the groove communicates with the cylinder is located at an inner end of the piston; the position where the groove communicates with the cylinder is provided with a mesh plate I; a plurality of meshes are formed in the mesh plate I; and an aperture of each of the meshes is less than the outer diameter of the energy-dissipating ball.

In order to further improve the damping effect, a plurality of damping nets are provided in the connecting tube at intervals, and a plurality of meshes are formed in each of the damping nets.

In order to further improve the damping effect, the connecting tube is bent into a wavy structure.

The present disclosure has the following beneficial effects: The present disclosure realizes factory prefabrication and field assembly of each component, improves production quality of the component, and makes connection joints transmit a force reliably, thereby significantly improving a safety of the foundation. The vibration damping mechanism slides to generate the damping force and energy dissipation. The larger the displacement of the vibration damping mechanism, the greater the damping force provided by the system. This effectively reduces vibration of an upper structure of the transmission tower, and lowers a probability of damaging the upper structure in a natural disaster. The present disclosure realizes hierarchical control under different loads. Under an action of a dynamic load such as a strong wind, a small sliding range of the vibration damping mechanism can realize vibration damping and energy dissipation purposes of the structure. When a strong dynamic load such as an earthquake is applied to the structure, the vibration damping mechanism reduces an impact on the structure, and the limiter limits a maximum displacement of the structure, thereby effectively making the structure safer in different natural disasters.

In the figures: 1: connection plate, 2: tower leg of transmission tower, 3: ball head I, 4: base, 5: T-shaped beam, 6: rubber pad, 7: vibration damping mechanism, 8: grouting hole, 9: connecting hole, 10: supporting beam, 11: ball head II, 12: limiter, 7.1: box body, 7.2: T-shaped groove, 7.3: bearing, 7.4: rotating shaft, 7.5: transmission disc, 7.6: transmission belt, 7.7: energy-dissipating disc, 7.8: track, 7.9: steel ball, 7.10: spring, 7.11: rotating collar, 7.12: connecting shaft, 7.13: pin roll, 7.14: connecting rod, 7.15: connecting tube, 7.16: cylinder, 7.17: damping net, 7.18: groove, 7.19: energy-dissipating ball, 7.20: mesh plate I, 7.21: mesh plate I, 7.22: damping liquid, 7.23: piston, and 7.24: damping liquid cavity.

DETAILED DESCRIPTION OF THE EMBODIMENTS

The present disclosure is further described below with reference to FIG. 1 to FIG. 4.

Figure 1:
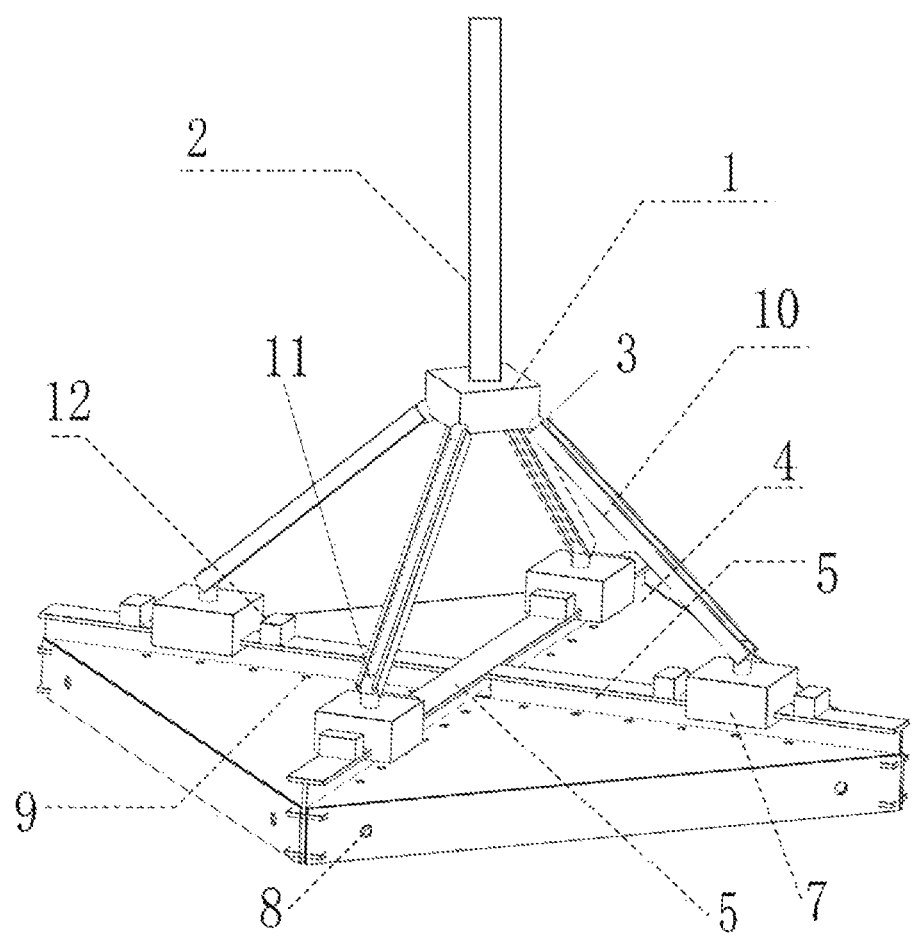
FIG. 1 is a perspective structural schematic view according to the present disclosure.

As shown in FIG. 1, a modular energy-dissipating fabricated structure for a transmission tower includes base 4, two T-shaped beams 5, connection plate 1, and four supporting beams 10. The base includes an upper end provided with a plurality of connecting holes 9. After anchor bolts pass through the connecting holes 9, the base 4 is fixed in a foundation through nuts. The two T-shaped beams are provided crisscross on an upper end surface of the base 4. Vibration damping mechanisms 7 are respectively and slidably provided at two sides of each of the T-shaped beams 5. An upper end of each of the vibration damping mechanisms 7 is provided with ball head II 11. The connection plate is fixed at a lower end of tower leg 2 of the transmission tower. Ball heads I 3 are respectively provided at four lower corners of the connection plate 1. Ball grooves are respectively formed in an upper end and a lower end of each of the supporting beams 10. The ball head I 3 is rotatably provided in the ball groove in the upper end of the supporting beam 10. The ball head II 11 is provided in the ball groove in the lower end of the supporting beam 10. When the transmission tower moves longitudinally, the transmission tower drives the vibration damping mechanisms 7 via the connection plate 1 through the four supporting beams 10 to slide outward or inward along the T-shaped beams 5. The vibration damping mechanisms generate operation resistances relative to the T-shaped beams 5. The transmission tower in operation suffers a plurality of loads. Each load is transmitted to the connection plate 1 through the tower leg 2 of the transmission tower. The supporting beam 10 is rotatably connected to the connection plate 1 through the ball head I 3, and rotatably connected to the vibration damping mechanism 7 through the ball head II 11. Hence, the load is applied to the vibration damping mechanism 7 through the supporting beam 10. The vibration damping mechanism 7 can slide along the T-shaped beam 5 under an action of the load. A damping force of the vibration damping mechanism 7 can be adjusted, such that the vibration damping mechanism does not slide along the connecting beam in a normal load fluctuation range. In this case, the vibration damping mechanism 7 is fixedly connected to the T-shaped beam 5, thereby transmitting the load to the T-shaped beam 5. At last, the load is transmitted to the foundation through the base 4 to provide an enough carrying capacity for an upper structure.

Preferably, a cavity is provided in the base 4. Grouting holes 8 communicating with the cavity are formed in a periphery of the base 4. Concrete is poured into the cavity in the base 4 through the grouting holes 8. By pouring the concrete into the cavity, the entire rigidity of the whole base 4 can be increased to ensure a reliability in use.

When a dynamic load such as a strong wind is applied to the transmission tower, the load on the fabricated foundation is also ever-changing. While the load increases, and is beyond the normal load fluctuation range, the vibration damping system has a larger sliding range along the connecting beam. Therefore, preferably, the modular energy-dissipating fabricated structure for a transmission tower further includes limiters 12 provided at an upper end of the T-shaped beam 5 and respectively located at inner side and an outer side of the vibration damping mechanism 7. With the limiters 12 on the T-shaped beam 5, moving distances at the inner side and the outer side of the vibration damping mechanism 7 can be limited strictly. This prevents an excessive moving distance of the vibration damping mechanism 7 to cause separation from the T-shaped beam 5. Further preferably, the modular energy-dissipating fabricated structure for a transmission tower further includes rubber pads 6 respectively provided at a front side and a rear side of box body 7.1. Because of the rubber pads 6 at the front side and the rear side of the vibration damping mechanism 7, the vibration damping mechanism 7 coming in contact with the limiter 12 is collided with the limiter 12 through the rubber pad 6 for buffering. This prevents hard collision of the vibration damping mechanism 7 with the limiter 12 to cause a damage.

Embodiment 1

Figure 2:
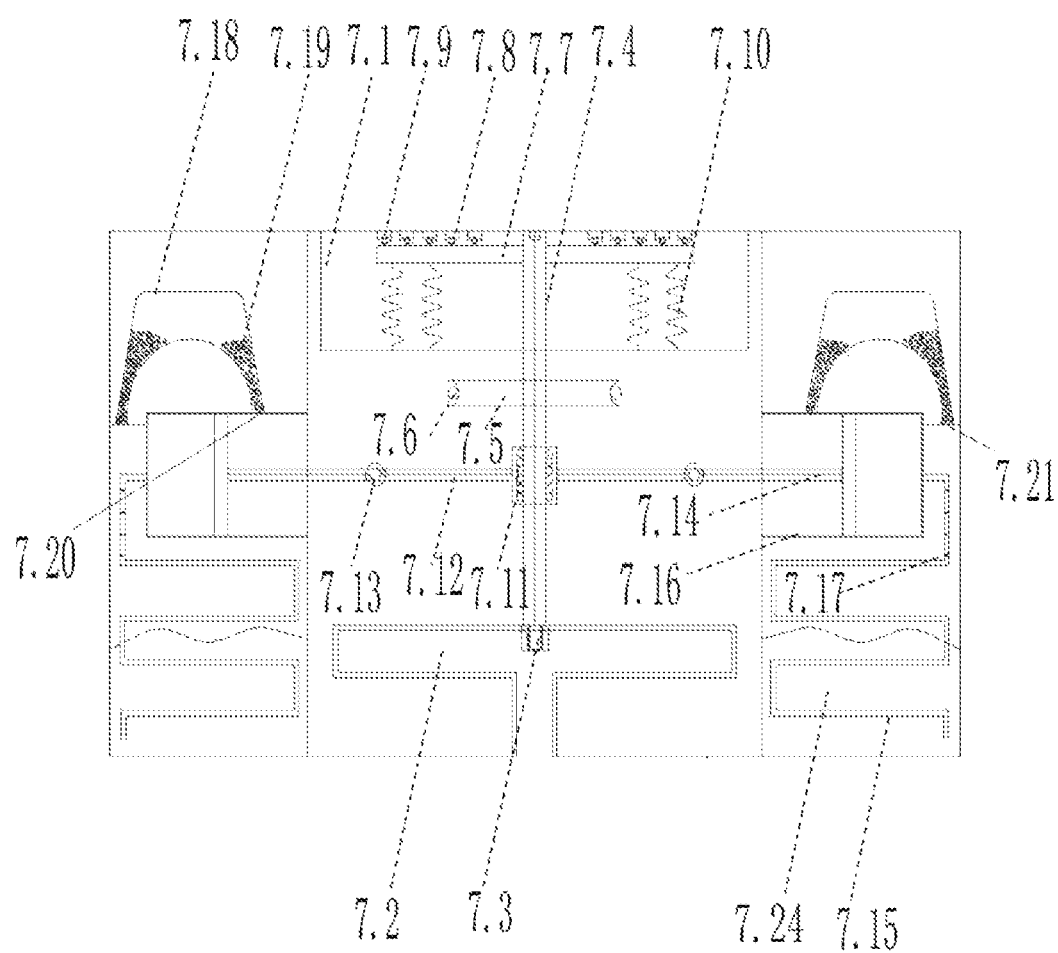
FIG. 2 is a front sectional schematic view of a vibration damping mechanism according to the present disclosure.

As shown in FIG. 2, the vibration damping mechanism 7 specifically includes box body 7.1, transmission disc 7.5, N tracks 7.8, and energy-dissipating disc 7.7.

The box body 7.1 is provided with a sealed cavity inside. T-shaped groove 7.2 matched with the T-shaped beam 5 is formed in a lower end of the box body 7.1. The box body 7.1 is slidably provided on the T-shaped beam 5 through the T-shaped groove 7.2.

A long hole is horizontally formed in an upper end of the T-shaped groove 7.2 along a length direction of the T-shaped beam 5. Rotating shaft 7.4 is provided along a vertical direction, with a lower end passing through the long hole and rotatably provided on the T-shaped beam 5 through bearing 7.3.

The transmission disc 7.5 is horizontally provided on the rotating shaft 7.4. Transmission belt 7.6 is horizontally provided in the box body 7.1 along the length direction of the T-shaped beam 5. After the transmission belt 7.6 wraps around the transmission disc 7.5, two ends of the transmission belt are respectively fixed on an inner wall of an inner end and an inner wall of an outer end of the box body 7.1.

The N tracks 7.8 are horizontally provided on a top inner wall of the box body 7.1 along the length direction of the T-shaped beam 5. Steel ball 7.9 is embedded into each of the tracks 7.8 in a rolling manner. Preferably, the N is 10.

The energy-dissipating disc 7.7 is horizontally provided on the rotating shaft 7.4. A plurality of springs 7.10 are fixed at a lower end of the energy-dissipating disc 7.7 along the vertical direction. A lower end of each of the springs 7.10 is connected to the box body 7.1. Under an elastic force of the spring 7.10, an upper end surface of the energy-dissipating disc 7.7 comes in contact with a lower end of the steel ball 7.9.

When the tower leg 2 of the transmission tower is stressed to move upward, the connection plate 1 pulls the vibration damping mechanism 7 through the supporting beam 10 to move inward. When the tower leg 2 of the transmission tower is not stressed to move downward, the connection plate 1 pushes the vibration damping mechanism 7 through the supporting beam 10 to move outward. In movement of the vibration damping mechanism 7, the rotating shaft 7.4 is rotatably provided on the T-shaped beam 5 through the bearing 7.3, and the transmission disc 7.5 is in transmission connection with the transmission belt 7.6. Therefore, when the vibration damping mechanism 7 moves, the transmission belt 7.6 drives the transmission disc 7.5 to rotate, thereby driving the rotating shaft 7.4 to rotate. The rotating shaft 7.4 in rotation drives the energy-dissipating disc 7.7 to rotate. The energy-dissipating disc 7.7 is pressed on the steel ball 7.9 through the elastic force of the spring 7.10. When the box body 7.1 moves, the steel ball 7.9 under a pressing force has a rolling friction with the rotating energy-dissipating disc 7.7. The steel ball 7.9 rolls along the track 7.8 to generate a damping force. Therefore, the vibration damping mechanism 7 of the box body has the damping force in movement, thereby realizing vibration damping and energy dissipation. When the energy-dissipating disc 7.7 rotates, the spring 7.10 is pulled. When the box body 7.1 is restored to an initial position, the spring 7.10 is restored, thereby driving the energy-dissipating disc 7.7 to rotate to an initial state for restoration.

Embodiment 2

Figure 3:
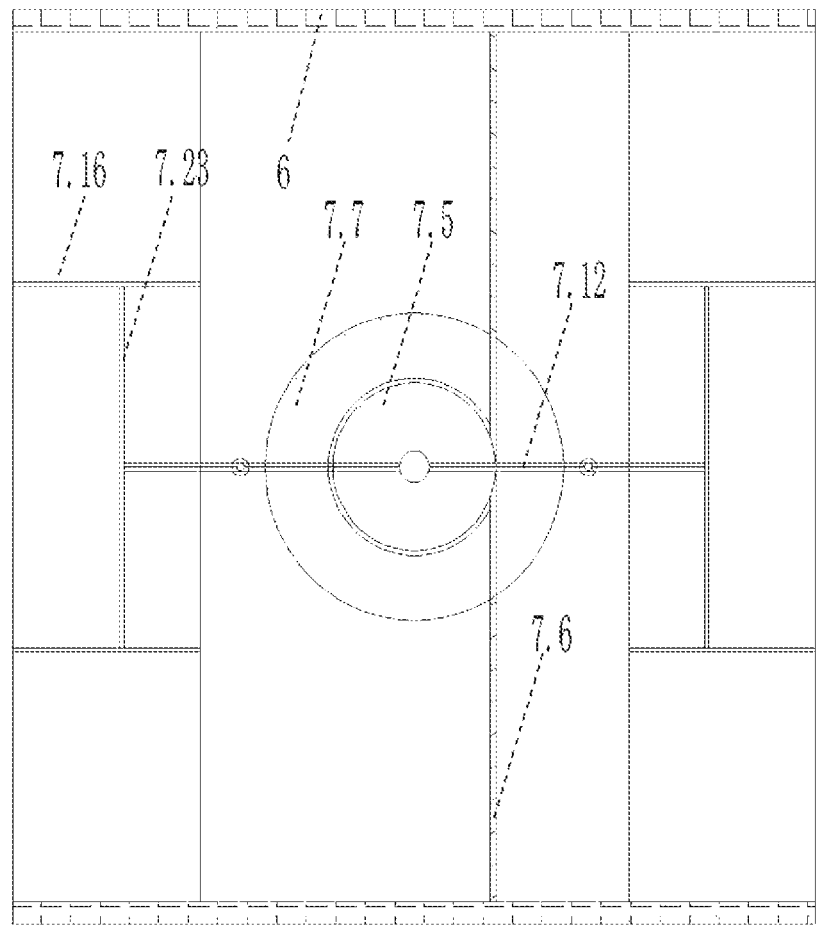
FIG. 3 is a top sectional schematic view of a vibration damping mechanism according to the present disclosure.

As shown in FIG. 2 and FIG. 3, on the basis of Embodiment 1, in order to further improve a damping effect, the modular energy-dissipating fabricated structure for a transmission tower further includes sealed damping liquid cavities 7.24 respectively formed in a left end and a right end of the box body 7.1. Damping liquid 7.22 is provided in each of the damping liquid cavities 7.24. Cylinders 7.16 are respectively provided at the left end and the right end of the box body 7.1 along a horizontal direction. Each of the cylinders 7.16 is sealed peripherally, with an open inner end. An axis of the cylinder 7.16 is horizontally provided along a left-right direction. Piston 7.23 is slidably provided in the cylinder 7.16 along the horizontal direction. An outer end of the cylinder 7.16 is airtightly connected to connecting tube

7.15. A lower end of the connecting tube 7.15 is soaked in the damping liquid 7.22. Rotating collar 7.11 is rotatably provided on the rotating shaft 7.4. Connecting shafts 7.12 are respectively hinged at a left end and a right end of the rotating collar 7.11. An outer end of the connecting shaft 7.12 is hinged with connecting rod 7.14 through pin roll 7.13. An outer end of the connecting rod 7.14 is connected to an inner end surface of the corresponding piston 7.23 at a same side. When the vibration damping mechanism 7 moves inward or outward, the rotating shaft 7.4 rotates. Since two connecting shafts 7.12 are respectively hinged at the left end and the right end of the rotating collar 7.11, and the rotating collar 7.11 is rotatably provided on the rotating shaft 7.4, when the vibration damping mechanism 7 moves, the connecting shaft 7.12 swings, and the connecting rod 7.14 pulls the piston 7.23 to slide to the inner end of the cylinder 7.16. Under an action of a negative pressure between the inner end and the outer end of the cylinder, the connecting tube 7.15 pumps the damping liquid 7.22 in the damping liquid cavity 7.24 into the cylinder 7.16. The damping liquid 7.22 flows in the connecting tube 7.15 to generate a resistance. Meanwhile, the piston 7.23 also generates a resistance when sliding in the cylinder 7.16. The vibration damping mechanism 7 has a greater damping value when sliding relative to the T-shaped beam 5. This further achieves more desirable vibration damping and energy dissipation through a small sliding range of the vibration damping mechanism 7 under the action of the dynamic load such as the strong wind.

Further preferably, a plurality of damping nets 7.17 are provided in the connecting tube 7.15 at intervals, and a plurality of meshes are formed in each of the damping nets 7.17. With the plurality of damping nets 7.17 in the connecting tube 7.15, a greater damping value is achieved when the damping liquid 7.22 passes through the damping nets 7.17, thereby further improving the damping force. The connecting tube 7.15 can also be bent into a wavy structure. The connecting tube 7.15 of the wavy structure is bent in a roundabout manner in the damping liquid cavity 7.24, such that a length of the connecting tube 7.15 is greatly increased. With the increased length of the connecting tube 7.15, the damping liquid 7.22 flows in the connecting tube 7.15 for longer time, thereby further improving the damping force.

Embodiment 3

Figure 4:
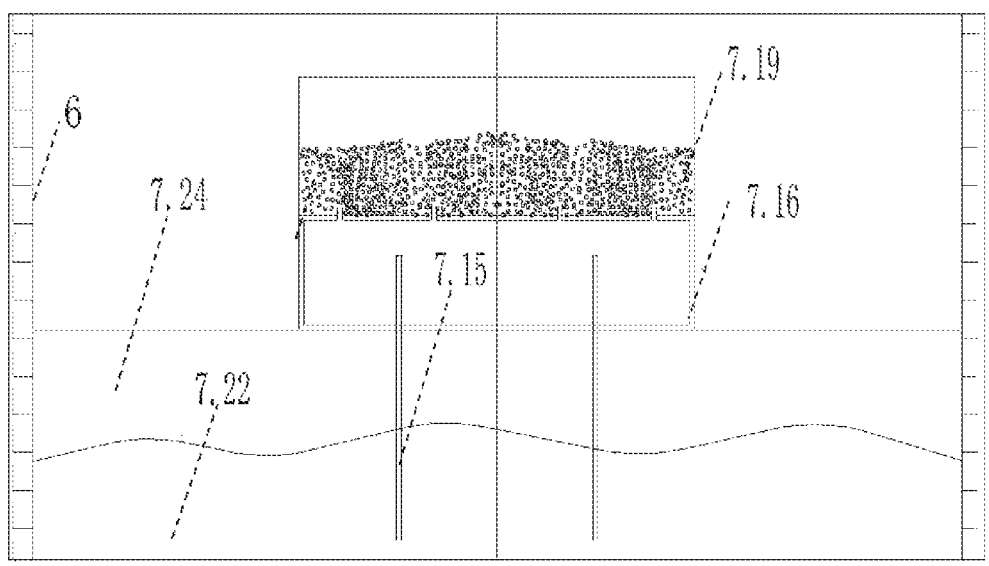
FIG. 4 is a side sectional schematic view of a vibration damping mechanism according to the present disclosure.

As shown in FIG. 2 and FIG. 4, on the basis of Embodiment 2, in order to further improve the damping effect, the modular energy-dissipating fabricated structure for a transmission tower further includes gate-shaped grooves 7.18 respectively formed in the left end and the right end of the box body 7.1. A plurality of energy-dissipating balls 7.19 are filled in each of the grooves 7.18. A bottom of an outer end of the groove 7.18 communicates with the damping liquid cavity 7.24. A position where the groove 7.18 communicates with the damping liquid cavity 7.24 is provided with mesh plate II 7.21. A plurality of meshes are formed in the mesh plate II 7.21. An aperture of each of the meshes is less than an outer diameter of the energy-dissipating ball 7.19. A bottom of an inner end of the groove 7.18 communicates with the cylinder 7.16. A position where the groove 7.18 communicates with the cylinder 7.16 is located at an inner end of the piston 7.23. The position where the groove 7.18 communicates with the cylinder 7.16 is provided with mesh plate I 7.20. A plurality of meshes are formed in the mesh plate I 7.20. An aperture of each of the meshes is less than the outer diameter of the energy-dissipating ball 7.19. When the piston 7.23 moves inward, the damping liquid 7.22 in the damping liquid cavity 7.24 enters the cylinder 7.16. A negative pressure is formed in the damping liquid cavity 7.24. In this case, air flows from the inner end of the groove 7.18 to the outer end of the groove, and enters the damping liquid cavity 7.24 through the mesh plate I 7.21. The flowing gas passes through gaps between the energy-dissipating balls 7.19 to generate a resistance. This further improves the damping force of the vibration damping mechanism 7 in movement. Likewise, when the piston 7.23 moves outward, the air flows from the outer end of the groove 7.18 to the inner end of the groove to generate a resistance. The mesh plate I 7.20 and the mesh plate 7.21 can prevent the energy-dissipating balls 7.19 from falling off.

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modifications, equivalent substitutions, improvements, etc. made within the spirit and scope of the present disclosure should be included within the protection scope of the present disclosure.

What is claimed is:

1. A modular energy-dissipating fabricated structure for a transmission tower, comprising:
   a base comprising an upper end provided with a plurality of connecting holes, wherein bolts passing through the connecting holes fix the base in a foundation via nuts on the bolts;
   two T-shaped beams provided crisscross on an upper end surface of the base, wherein vibration damping mechanisms are respectively and slidably provided at two sides of each of the T-shaped beams, and an upper end of each of the vibration damping mechanisms is provided with a ball head II;
   a connection plate fixed at a lower end of a tower leg of the transmission tower, wherein ball heads I are respectively provided at four lower corners of the connection plate; and
   four supporting beams, wherein ball grooves are respectively formed in an upper end and a lower end of each of the supporting beams, the ball head I is rotatably provided in the ball groove in the upper end of the supporting beam, and the ball head II is provided in the ball groove in the lower end of the supporting beam,
   wherein when the transmission tower moves longitudinally, the transmission tower drives the vibration damping mechanisms via the connection plate through the four supporting beams to slide outward or inward along the T-shaped beams, and the vibration damping mechanisms generate operation resistances relative to the T-shaped beams;
   a cavity is provided in the base; grouting holes capable of having concrete poured there through communicating with the cavity are formed in a periphery of the base, wherein concrete is located in the cavity holes; and
   the vibration damping mechanism comprises:
   a box body provided with a sealed cavity inside, wherein a T-shaped groove matched with the T-shaped beam is formed in a lower end of the box body, and the box body is slidably provided on the T-shaped beam through the T-shaped groove; and
   a long hole is horizontally formed in an upper end of the T-shaped groove along a length direction of the T-shaped beam; and a rotating shaft is provided along a vertical direction, with a lower end passing through the long hole and rotatably provided on the T-shaped beam through a bearing;

a transmission disc horizontally provided on the rotating shaft, wherein a transmission belt is horizontally provided in the box body along the length direction of the T-shaped beam; and after the transmission belt wraps around the transmission disc, two ends of the transmission belt are respectively fixed on an inner wall of an inner end and an inner wall of an outer end of the box body;

N tracks horizontally provided on a top inner wall of the box body along the length direction of the T-shaped beam, wherein a steel ball is embedded into each of the tracks in a rolling manner; and an energy-dissipating disc horizontally provided on the rotating shaft, wherein a plurality of springs are fixed at a lower end of the energy-dissipating disc along the vertical direction; a lower end of each of the springs is connected to the box body; and under an elastic force of the spring, an upper end surface of the energy-dissipating disc comes in contact with a lower end of the steel ball.

2. The modular energy-dissipating fabricated structure for a transmission tower according to claim 1, further comprising limiters provided at an upper end of the T-shaped beam and respectively located at an inner side and an outer side of the vibration damping mechanism.

3. The modular energy-dissipating fabricated structure for a transmission tower according to claim 1, further comprising rubber pads respectively provided at a front side and a rear side of the box body.

4. The modular energy-dissipating fabricated structure for a transmission tower according to claim 1, wherein the N is 10.

5. The modular energy-dissipating fabricated structure for a transmission tower according to claim 1, further comprising sealed damping liquid cavities respectively formed in a left end and a right end of the box body, wherein a damping liquid is provided in each of the damping liquid cavities; cylinders are respectively provided at the left end and the right end of the box body along a horizontal direction; each of the cylinders is sealed peripherally, with an open inner end; an axis of the cylinder is horizontally provided along a left-right direction; a piston is slidably provided in the cylinder along the horizontal direction; an outer end of the cylinder is airtightly connected to a connecting tube; a lower end of the connecting tube is soaked in the damping liquid; a rotating collar is rotatably provided on the rotating shaft; connecting shafts are respectively hinged at a left end and a right end of the rotating collar; an outer end of the connecting shaft is hinged with a connecting rod through a pin roll; and an outer end of the connecting rod is connected to an inner end surface of the corresponding piston at a same side.

6. The modular energy-dissipating fabricated structure for a transmission tower according to claim 5, further comprising gate-shaped grooves respectively formed in the left end and the right end of the box body, wherein a plurality of energy-dissipating balls are filled in each of the gate-shaped grooves; a bottom of an outer end of the gate-shaped groove communicates with the damping liquid cavity; a position where the gate-shaped groove communicates with the damping liquid cavity is provided with a mesh plate II; a plurality of meshes are formed in the mesh plate II; an aperture of each of the meshes is less than an outer diameter of the energy-dissipating ball; a bottom of an inner end of the gate-shaped groove communicates with the cylinder; a position where the gate-shaped groove communicates with the cylinder is located at an inner end of the piston; the position where the gate-shaped groove communicates with the cylinder is provided with a mesh plate I; a plurality of meshes are formed in the mesh plate I; and an aperture of each of the meshes is less than the outer diameter of the energy-dissipating ball.

7. The modular energy-dissipating fabricated structure for a transmission tower according to claim 5, wherein a plurality of damping nets are provided in the connecting tube at intervals, and a plurality of meshes are formed in each of the damping nets.

8. The modular energy-dissipating fabricated structure for a transmission tower according to claim 5, wherein the connecting tube is bent into a wavy structure.

\* \* \* \* \*